March 23, 1965  R. R. SPENCER  3,174,351
DRIVE MECHANISM
Filed Nov. 1, 1961  3 Sheets-Sheet 1
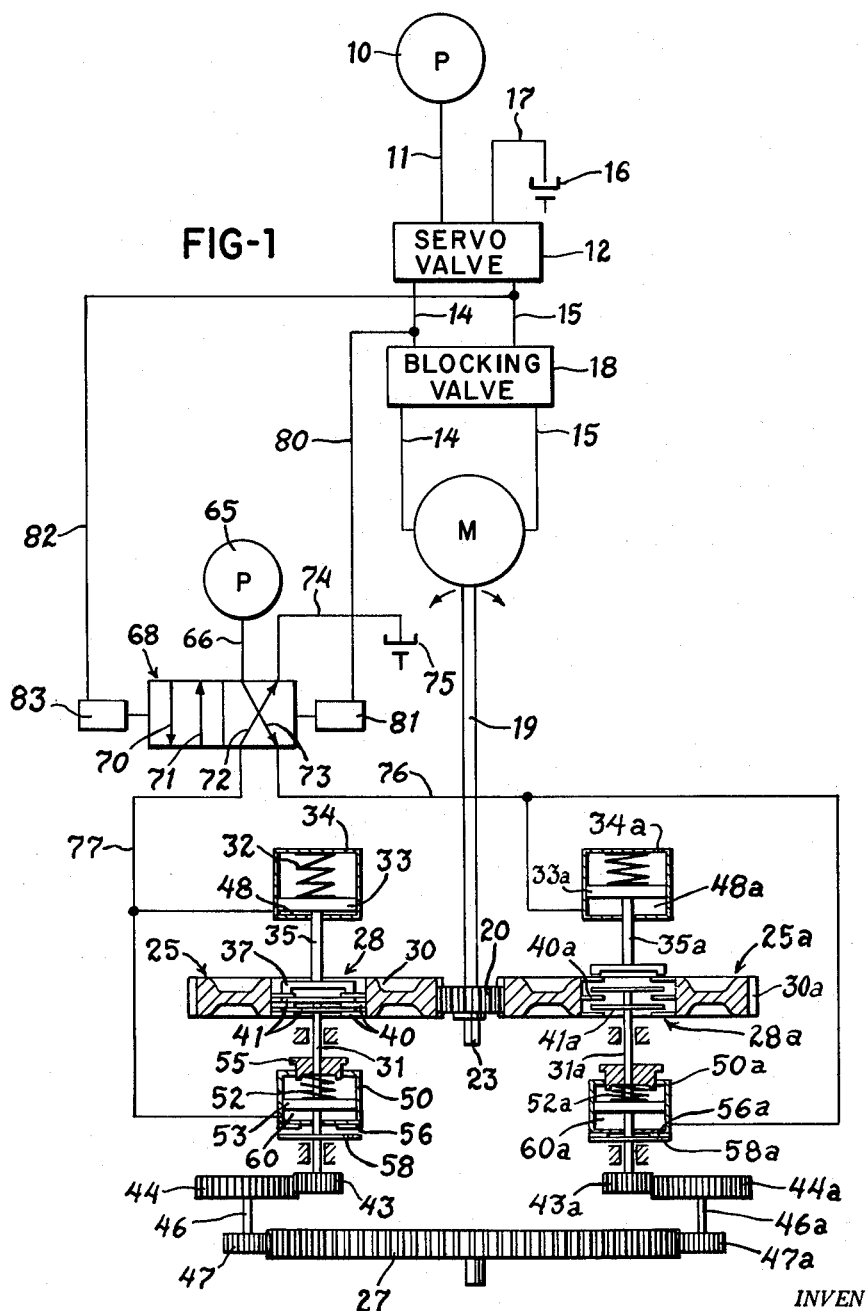
INVENTOR.
RICHARD R. SPENCER
BY
Marechal, Biebel, French & Bugg
ATTORNEYS

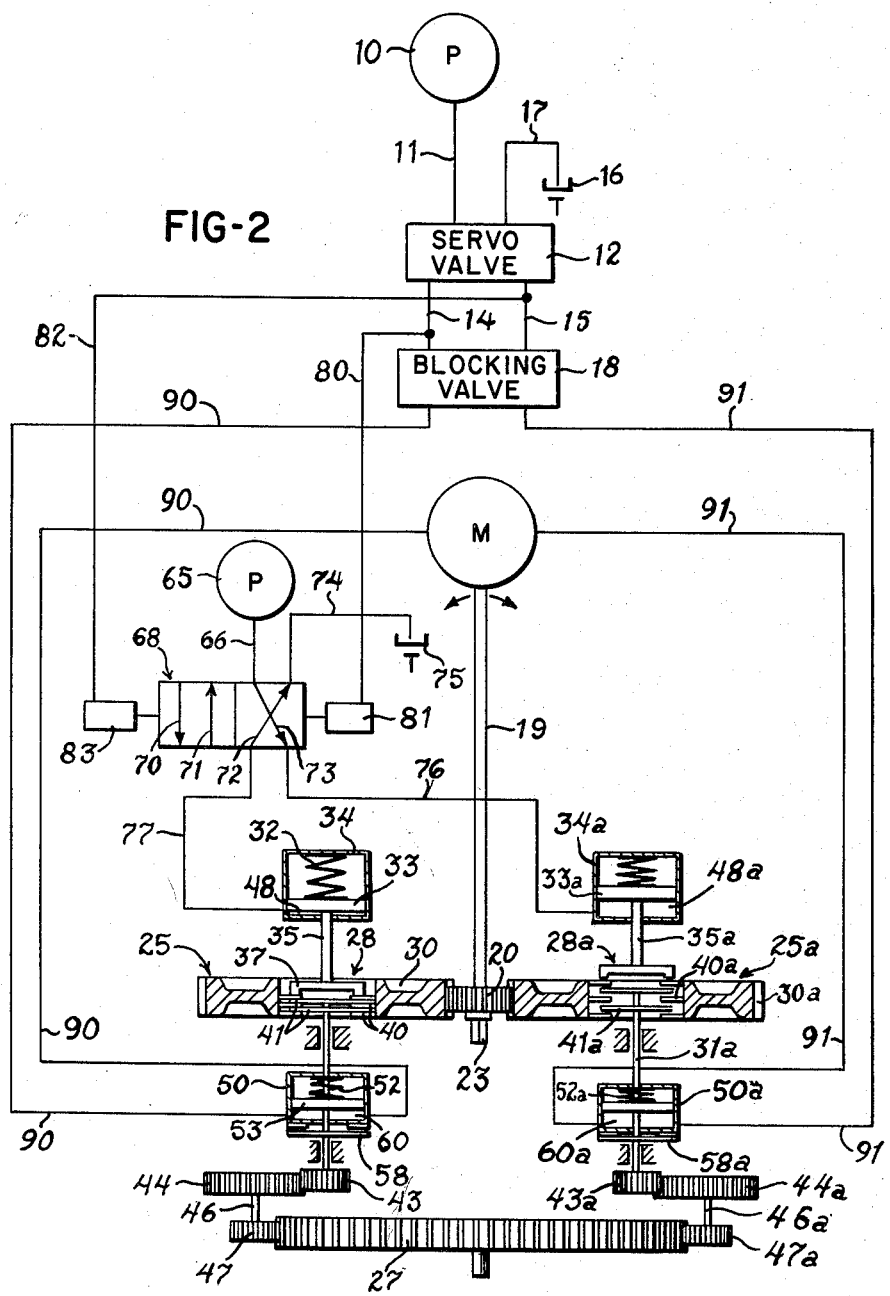

March 23, 1965  R. R. SPENCER  3,174,351
DRIVE MECHANISM
Filed Nov. 1, 1961  3 Sheets-Sheet 3
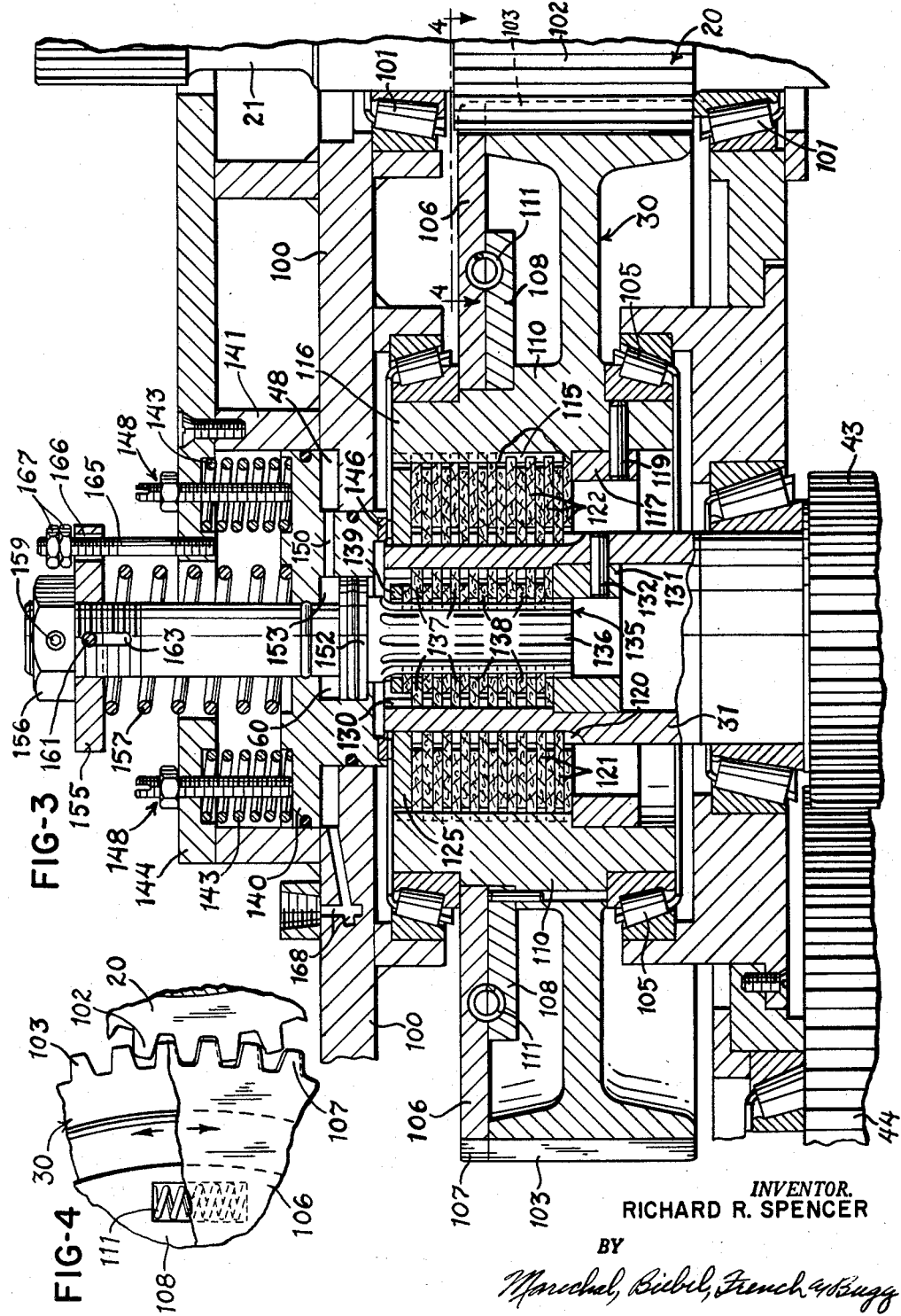
INVENTOR.
RICHARD R. SPENCER
BY
Marechal, Biebel, French & Bugg
ATTORNEYS

United States Patent Office 3,174,351
Patented Mar. 23, 1965

3,174,351
DRIVE MECHANISM
Richard R. Spencer, Springfield, Ohio, assignor to Kelsey-Hayes Company, Springfield, Ohio, a corporation of Delaware
Filed Nov. 1, 1961, Ser. No. 149,336
6 Claims. (Cl. 74—409)

This invention relates generally to drive assemblies and specifically to precision gear drives.

Since there is inherently a certain degree of looseness in any gear train due primarily to the clearance between the meshing gear teeth, backlash occurs when the direction of rotation thereof is reversed or the equipment being driven overrides the driving motor. The overriding occurs primarily when the motor or driving mechanism attempts to decrease the speed of rotation of the driven equipment. Such backlash is well known to be highly undesirable as it creates extraordinarily high stresses in the gear teeth, as well as in other elements of the drive mechanism and causes momentary loss of accurate control of the driven equipment. The latter factor is important when driving heavy but highly sensitive equipment, such as a radar antenna which must have its position accurately controlled at all times.

Accordingly, it is one object of the present invention to provide an improved mechanical drive system which is free of backlash.

Another object of this invention is to provide a gear drive assembly of the anti-backlash type wherein the anti-backlash apparatus is actuated in response to the direction of torque application of the driving motor thereby substantially reducing the factors which decrease efficiency of such a gear drive assembly.

A further object of the invention is to provide a control system for a precision gear drive assembly which automatically controls the operation of an anti-backlash mechanism in response to the direction of torque application of the driving motor.

Still another object of the invention is to provide a new and improved gear train having a clutch mechanism and an anti-rotational force generating mechanism associated therewith and which consumes a minimum of space and energy while providing highly sensitive and efficient apparatus.

A still further object of this invention is to provide a drive assembly which will automatically take up gear tooth clearance throughout the drive assembly.

Still another object of this invention resides in the provision of a gear drive assembly having a backlash eliminating arrangement wherein the anti-rotational forces exerted by the aforesaid arrangement can be manually adjusted.

Another object of the present invention is to provide an anti-backlash gear system wherein the anti-backlash forces are proportional to the torque generated by the driving motor thereby providing increased resistance to inertial override during rotation at high speeds.

Other objects and advantages of the invention will be apparent from the following description, the accompanying drawings, and the appended claims.

In the drawings—

FIG. 1 is a diagrammatic showing of the invention;

FIG. 2 is a diagrammatic illustration similar to FIG. 1 and showing another embodiment of the invention;

FIG. 3 is a cross-section through a preferred clutch-drag brake vertical assembly; and FIG. 4 is an enlarged elevational view essentially along the line 4—4 of FIG. 3.

Referring to the drawings, which illustrate preferred embodiments of the invention, FIG. 1 illustrates diagrammatically a pressure source 10 supplying pressurized fluid through conduit 11 to the servo valve 12 which may connect the conduit 11 to either conduit 14 or 15 thereby supplying pressurized fluid to one side or the other of the motor M. When one side of the motor M has the fluid connected thereto servo valve 12 connects the other side to the reservoir 16 through conduit 17. In addition to controlling the direction of rotation of motor M, the servo valve 12 controls the amount of fluid flowing therethrough and consequently the speed and torque of such motor.

A blocking valve 18 is interposed in the lines 14 and 15 and is capable of blocking flow therethrough during emergencies, such as, sudden loss of fluid pressure in the system. If such an emergency occurs the blocking valve 18 merely seals conduits 14 and 15 thereby trapping the fluid in the lines 14 and 15 between the blocking valve and the motor M and locking the motor against rotation during the aforesaid emergency. However, during normal use the blocking valve 18 does not affect the operation of the system and could be eliminated without departing from the scope of the invention.

The output shaft 19 of the motor has an input pinion 20 suitably secured thereto. A square hub 23 may be attached to the input pinion 20 so that, if desired, the gear system may be rotated manually by attaching a crank to the hub 23 and imparting rotation thereto.

Two identical gear trains 25 and 25a interconnect the pinion 20 and the output gear 27, the latter gear being suitably connected to the equipment which is being driven by the motor M, for example, a heavy radar antenna. The gear train 25 on the left side of FIG. 1 is shown in driving relation so that the rotation of pinion 20 is transferred therethrough to drive the output gear 27. In detail, the hydraulically actuated normally engaged clutch indicated generally at 28, is shown in its engaged position wherein it couples the input gear 30 which is in continuous engagement with the pinion 20 to the shaft 31. The clutch is actuated by spring 32 interposed between the piston 33 and the stationary housing 34 which urges the piston 33 and the attached rod 35 and thrust member 37 downwardly to a position wherein the annular friction of plates 40 of the clutch frictionally engage the friction plates 41 rigidly secured on shaft 31 to thereby couple the gear 30 and the shaft 31. The friction plates 40 are secured to gear 30 in a manner providing relative axial movement without relative rotary movement therebetween. For example, the plates 40 could engage axially extending splines on the inner surface of the gear hub. Similarly, the plates 41 on shaft 31 will move axially thereon while rotating with the shaft. These axial movements permit the plates to be compressed together thereby locking the gear 30 to the shaft 31. When the gear 30 and shaft 31 are coupled rotary motion of the latter drives the output gear 27 through intermediate pinion 43, gear 44, shaft 46, and output pinion 47. Below piston 33 there is a chamber 48 which when pressurized will move piston 33 upwardly against the bias of spring 32 to thereby relieve the compressive force of spring 32 on friction plates 40–41, disengaging the clutch for a purpose and in a manner described hereinafter.

On the shaft 31, intermediate the gear 30 and the pinion 43 is a normally disengaged drag or friction brake having housing 50 which will reciprocate on but not rotate with the shaft 31. The spring 52 is positioned between the piston 53 which is secured against axial movement on shaft 31 and the adjustable collar 55 which is threaded into the housing 50. Spring 52 constantly urges the friction plate 56 on the housing 50 away from the disk-shaped friction plate 58 which is rigidly secured to the shaft 31. The preloading of the spring 52 can be readily adjusted by rotating the collar 55 into or out of the housing 50. When the chamber 60 in housing 50 is pressurized the housing and friction plate 56 are forced downwardly into frictional contact with the friction plate 58 thereby developing an antirotational force by their contact.

The gear train 25a, as shown on the right side of FIG. 1 is identical to the train 25 on the left side of FIG. 1, and the components are designated by like reference characters with the addition of a lower case a to the components of the train on the right side. The train 25a is shown with pressure applied to chambers 48a and 60a to disengage the clutch and engage the drag brake. This causes the shaft 35a to relieve pressure on thrust member 33a and thereby separate the friction plates 40a–41a so that no rotational movement is transferred to the shaft 31 from the pinion 20.

In this position, the gear 30a freewheels with the piston 20 and it may be desirable to insert a conventional anti-backlash device between these two gears, e.g., spring preloaded split gears. Such a device however would only be sufficient to overcome the bearing friction and the inertia of the freewheeling gear and, therefore eliminate backlash between the input pinion 20 and the gear 30 or 30a only during such freewheeling and could be eliminated without departing from the scope of the invention.

Similarly, fluid has been supplied to the housing 50a of the drag brake thereby forcing the friction plates 56a–58a together to impart an anti-rotational or drag force to the output gear 27 via the pinion 43a, gear 44a, shaft 46a, and output pinion 47a. The amount of this anti-rotational force can be varied by adjusting the preload of the spring 52a in the aforementioned manner to thereby correspondingly vary the pressure required to overcome this preload. The remaining force of the pressurized fluid is then utilized to urge the friction surfaces of plates 56a and 58a together. This pressure will never be sufficient to couple the friction plates 56–58 or 56a–58a but only imparts a drag or anti-rotational force to the associated gear train. The bias of spring 52 or 52a can, however, be sufficiently increased to maintain the associated brake in the disengaged position even when pressure is supplied thereto.

The hydraulic control system which is utilized to operate the clutches and the drag brakes is of particular importance to this invention. It includes a fluid pressure source 65 separate from source 10 so as not to disrupt the operation of the motor by diminishing the pressure used to operate it. Line 66 connects source 65 to a two position four-way valve 68 having four separate passages 70, 71, 72 and 73 therethrough. Also, connected to the four-way valve 68 by conduit 74 is the reservoir 75. In the first position, as shown in FIG. 1, passage 73 connects the line 66 and the pressure source 65 to line 76 and gear train 25a while the passage 72 connects the line 74 and the reservoir 75 to line 77 and train 25. When the four-way valve is shifted to the right the passage 70 interconnects lines 66 and 77 while the passage 71 interconnects lines 74 and 76 thereby connecting the left gear train 25 to the pressure source and the right gear train 25a to the reservoir 75.

The four-way valve 68 which, as described above, controls the application of pressure to the clutches and drag brakes, is positioned in response to the direction of drive of motor M. That is, line 80 interconnects fluid line 14 and the actuator 81 while the line 82 interconnects the fluid line 15 and the actuator 83. Actuators 81 and 83 are suitably connected to four-way valve 68, in order to reciprocate it between the two previously described alternate positions. Since the pressure on the inlet side of motor M will always be higher than that of the outlet side and since these pressures are communicated to the actuators 81 and 83, it should be apparent that the four-way valve 68 will be positioned in response to positioning of the servo valve 12. For example, when the servo valve 12 connects the pressure line 11 with the line 15, the high pressure will be communicated through line 82 to the actuator 83 which will then move the valve toward the right from the position shown in FIG. 1. Since the line 80 is connected to the reservoir via line 14 no resistance will be offered to this movement by actuator 81. Similarly, when the servo valve 12 interconnects pressure lines 11 and 14, line 80 will conduct the pressurized fluid to actuator 81 and move the four-way valve 68 to the left as viewed in FIG. 1.

Generally, the direction of rotation of the motor M corresponds to the positioning of the servo valve 12 but when the direction of the motor is reversed there is a short time interval in which this is not true. When the servo valve 12 is shifted the motor must slow down the equipment being driven before it reverses direction. Hence, during this slowing down only the direction of drive or torque application of the motor corresponds to the position of the servo valve 12 whereas the direction of rotation of the motor does not. That is, the output of the motor will be slowing down the rotation of the equipment being driven although the direction of rotation has not yet reversed. The time required to slow this equipment down and reverse its direction depends on, inter alia, the inertia of the equipment and the torque generated by the motor. It is when this direction of drive or torque application is reversed that the direction of drive between the teeth on the pinions 47–47a and the output gear reverses and hence this is the point at which the direction of drag is also reversed in order to eliminate backlash.

Therefore, it should be understood that there is an important distinction to be observed between the language "direction of rotation" and "direction of drive or torque application." As pointed out above they are not always in the same direction.

To summarize, the operation of the control system, when the motor is rotating in one direction the four-way valve 68 is automatically positioned so that one of the gear trains will permit the rotary movement of the input pinion 20 to be transferred therethrough to the output gear 27 while the opposite gear train will impart an anti-rotational force to the output gear. When the direction of drive of motor M is reversed, the four-way valve 68 is automatically shifted in the aforementioned manner, to permit the pinion 20 to drive gear 27 through the opposite gear train while the drag brake of the first train is engaged to impart an anti-rotational force thereto.

It should be apparent that gear tooth clearance is taken up at all times, regardless of whether the particular train is driving or dragging, in the direction of drive of that particular train thereby eliminating backlash when the direction of drive is reversed, either by reversing the direction of drive of the motor or when the equipment tends to override the motor M. That is, when the rotation is being transferred through a first gear train the gear tooth clearance is obviously taken up in the direction of drive. At the same time, an anti-rotational force is being imparted to the second train which resists the rotation of the first train and takes up the gear clearance in a direction opposite to that of the first train and in the direction in which this train will drive. When the direction of torque application of the motor is reversed the rotation of the motor M is transferred through the second train whose gear tooth clearance has already been taken up in the direction of drive. Simultaneously therewith, the anti-rotational force is imparted to the first gear train to maintain the gear teeth in contact in the aforementioned first direction.

When the fluid pressure is not communicated to either train 25 or 25a the gear system can be manually rotated by attaching a crank to the stud 23. Since both clutches will be engaged and both drag brakes disengaged the manual rotation will be transferred to gear 27 through both trains 25 and 25a without any substantial resistance by the drag brakes.

When the motor M is generating a comparatively high torque backlash is particularly undesirable due to the relatively high stresses which occur when the system backlashes. Accordingly, the embodiment shown in FIG. 2, wherein components which are identical to FIG. 1 are designated by like reference characters, provides a hydraulic control system which proportions the anti-rotational force of the drag brakes in accordance with the torque generated by the motor M so that at low torque there is low drag and, at high torque there is a proportionally high drag imparted to the output gear 27.

The pressure differential between the input and output of the motor M is an accurate indication of the torque generated thereby as well as the direction of torque application of this motor. Hence, the drag brakes are mounted in the fluid conduits 90 and 91 connecting the servo valve 12 and the motor M so that fluid passing to and from the motor M passes through the brakes. Specifically, brake chamber 60 is interposed in the fluid conduit 90 which connects the servo valve 12 to the motor M while the other brake chamber 60a is interposed in the fluid conduit 91 which connects the servo valve 12 with the other side of motor M. Consequently when the servo valve 12 connects the source 10 with the line 90 the left drag brake is engaged and exerts an anti-rotational force which is directly proportional to the motor input pressure and consequently the torque generated by the motor. The right brake in the line 91 which is now connected to reservoir remains disengaged. As the inlet pressure to motor M is increased there is proportional increase in the motor torque and the force resisting anti-backlash is correspondingly increased. Consequently the dragging force is directly proportional to the torque of the motor within its range of operation. The drag brake friction plates never become coupled and usually have their range of operation between zero and about ten percent of the drive torque.

When the direction of rotation of the motor M is reversed the pressure source 10 is then connected to the conduit 91 and the high pressure communicated to the right drag brake to generate anti-rotational force in a manner similar to that set forth above.

In the FIG. 2 embodiment the four-way valve 68 is positioned in response to the direction of torque application of the motor M and controls the clutches in the same manner as the aforesaid FIG. 1 embodiment with the lines 76 and 77 no longer communicating with the drag brakes. The remainder of the FIG. 2 embodiment operates in the same manner as the FIG. 1 embodiment.

The above embodiments have been illustrated diagrammatically, and therefore any particular construction of the components of the system can be utilized so long as such components perform the function set forth. For example, it is contemplated that many known clutches and anti-rotation force producing means can be utilized to fulfill the function of the clutches and the drag brakes.

FIG. 3 illustrates a preferred clutch-drag brake mechanism which functions in accordance with the above described control system. While this mechanism is preferred, it is to be understood that the control system is contemplated for use with clutch-drag brakes of other structural configurations and arrangements. However, for ease of understanding the following description, the reference characters used in the diagrammatically shown gear train and clutch-drag brake combination of FIG. 1 will be utilized to indicate like parts in FIG. 3.

The partially shown input shaft 21 is motor driven and has an input pinion 20 mounted thereon, the shaft 21 being supported for rotation in the housing 100 by the roller bearings 101 mounted above and below pinion 20. The gear teeth 102 of the pinion 20 continuously mesh with the teeth 103 of the gear 30. The gear, as shown, is of relatively large diameter when compared with pinion 20 and is mounted in the housing 100 by the roller bearings 105 in a manner similar to that utilized to support the shaft 21. Of course, diameters of the gear and pinion can be varied to obtain the desired gear ratio without departing from the invention.

A split ring loaded gear 106 of conventional design is utilized to eliminate backlash between the pinion 20 and the gear 30 while the latter is freewheeling. As shown in FIGS. 3 and 4, gear 106 of relatively small thickness and having teeth 107 is mounted on the flange member 108 around the hub 110 of the gear 30. In the cylinder shaped void formed between the flange member 108 and the gear 106 is mounted a coil spring 111 (see FIG. 4) which urges the split gear 106 toward an angularly spaced position with respect to the gear 30, so that the gear teeth 103 and 107 are axially misaligned. Gear teeth clearance is eliminated by the contact of teeth 102 of pinion 20 with either the main gear teeth 103 or the teeth 107 of the split gear and the teeth 102 of the input pinion 20. Consequently the split gear 106 takes up the gear tooth clearance therebetween to obviate backlash while the gear is freewheeling. It should be apparent that this system is effective only to eliminate backlash between the pinion 20 and gear 30 while the latter is freewheeling and that, therefore, it is not absolutely essential to the invention since it will not affect the backlash of the entire gear train when connected.

A disk type clutch is provided between the hub 110 of gear 30 and the shaft 31. Hub 110 has internal splines 115 formed therein which extend axially from the hub end 116 to the bearing ring 117 which is rigidly connected to the internal portion of the hub by pin 119. Similarly, the hollow output shaft 31 which is mounted for rotation in the housing 100 has external splines 120 thereon which extend axially from the upper end downwardly a distance which is slightly greater than the length of the splines 115 in the hub 110. A series of interleaved friction plates 121–122 are then interposed between the hub 110 and the output shaft 31 and alternately engage the splines 115–120, respectively, so that axial movement thereof is permitted while angular movement is prevented. The lowermost friction plate contacts the bearing ring 117 and prevents further downward movement of the plates. Above the topmost friction plate is a bearing member 125 which is splined to the shaft 31 in the same manner as friction plates 121 and which, when pressure is exerted thereon, compresses the friction plates 121–122 against the bearing ring 117 to thereby couple the gear 30 with the output shaft 31 so that rotation of the former will be transferred to the latter.

A disk-type drag brake is provided to impart an anti-rotational force to shaft 31 and includes longitudinal internal splines 130 on the internal portion of the output shaft 31 which extend from the end thereof to a bearing member 131 rigidly secured therein by the pin 132. A non-rotatable shaft 135 having splines 136 thereon projects downwardly into the hollow portion of the output shaft 31 to a point below the upper edge of the bearing member 131. In the same manner as the clutch arrangement, interleaved friction plates 137–138 alternately engage the splines 130–136, respectively, so that when the shaft 135 acting through the thrust ring 139 is moved downwardly it compresses the friction plates 137–138 and a dragging or anti-rotational force is imparted to the output shaft 31. The contact areas of these plates 137–138 are small and the center of contact is closer to the center of rotation so that the force generated by their frictional engagement is somewhat less than that of the clutch and provides only an anti-rotational force which is never sufficient to actually couple or interconnect the shafts 31 and 135.

The apparatus for applying the pressure to the friction plates 121–122 includes the piston 140 which reciprocates within the cylinder 141 formed in the housing 100. Coil springs 143 interposed between the cover 144 of cylinder 141 and the piston 140 urge the latter continually downward to apply a force through the needle bearing 146 to the member 125 to compress the friction plates 121–122 and thereby couple them together. The amount of travel of the piston within its cylinder is limited to stop members 148 which are adjustable to increase or decrease the permissible travel of the piston 140 with consequent increase or decrease of the sensitivity of the apparatus. When it is desired to disengage the clutch the pressurized fluid is communicated to the chamber 48 below the piston 140 through the port 150 to thereby move the piston against the bias of the springs 143 and relieve the pressure exerted through the needle bearings 146 on the bearing member 125.

The apparatus utilized to compress the friction plates 137–138 of the drag brake together includes the piston 152 which is mounted within the cylinder 153 formed in the piston 140 and the elongated shaft 135 which extends outwardly from the piston 140 and the housing 100. Interposed between the piston 140 and an annular ring 155 secured on the shaft 135 by a nut 156 is a spring 157 which urges the shaft 135 upwardly with respect to piston 140 and housing 100 so that force is not transmitted through the ring 139 to compress the friction plates 137–138 and impart an anti-rotational force to the output shaft 31. The amount of bias exerted by the spring 157 can be changed by merely loosening the socket head screw 159 in the nut 156 and turning the latter in one direction or another to thereby change the preloading of the spring 157. A pin 161 extends through the shaft 135 and is connected to the ring 155 to limit its axial travel of the ring 155 to the length of the slot 163.

The stop means including the rod 165 which extends through the aperture 166 in ring 155 and has lock nuts 167 on one end thereof is utilized to prevent rotation of the ring 155, and consequently shaft 135, as well as to limit the axial travel of the shaft 135.

At the same time fluid pressure is communicated to the chamber 48 below the piston 140 it flows through the piston 140 via the passageway 150 to the chamber 60 thereby tending to move the piston 152 and shaft 135 downwardly with respect to the piston 140. Piston 140 is moved upward to relieve the pressure on the clutch friction plates 121–122 while simultaneously the piston 152 moves downwardly to impart a compressing force on the drag brake friction plates 137–138 to thereby frictionally engage the latter to impart an anti-rotational force to the output shaft 31.

This anti-rotational force is adjusted and controlled by the bias of spring 157. When it is desired to impart a large anti-rotational force to the output shaft, e.g., during high torque and high speed gear rotation, the nut 156 is adjusted to decrease the preloading of the spring thereby enabling the fluid pressure in the chamber to utilize a larger portion of its force to move the piston 152 and less of this pressure is utilized to overcome the bias of the spring 157. Conversely, when it is desired to decrease the amount of anti-rotational force imparted by the drag brake, the bias of spring 157 is increased thereby requiring more of the force generated by the fluid pressure to overcome the bias of the spring 157 and less of such force to move the piston 152 relative to the piston 140 to impart compression of the friction plates. By sufficiently increasing the preloading of the spring 157 the drag brake could, if desired, be completely eliminated from the system.

When two of these clutch systems are mounted in the manner shown and described in FIG. 1 and their outputs connected to the output gear 27 in like manners and the hydraulic control system of the FIG. 1 embodiment appropriately connected, the system will operate as described. Similarly, the above described preferred embodiment could be utilized with the control system shown in FIG. 2 by merely eliminating the passage between chambers 48 and 60 and supplying the pressure to the chamber 60 in a manner separate and distinct from the supply to chamber 48. For example, line 90 or 91 of FIG. 2 could be connected to chamber 60 of FIG. 3 by a passage through the shaft 135.

While the forms of apparatus herein described constituted preferred embodiments of the invention, it is to be understood that the invention is not limited to these precise forms of apparatus, and that changes may be made therein without departing from the scope of the invention which is defined in the appended claims.

What is claimed is:

1. A drive assembly for selectively driving and imparting an anti-rotational force to an output gear including a housing, a gear rotatably mounted in said housing, a hollow hub on said gear having axially extending splines on the internal surface thereof, a hollow shaft rotatably mounted in said housing and having one end extending into said hub and radially spaced therefrom, the other end of said hollow shaft connected to said output gear, external and internal axially extending splines on one end of said shaft, first friction plates engaging and axially movable on said splines in said hub, second friction plates engaging and axially movable on said external splines and being interleaved with said first friction plates, first stop means in said hub or said one end of said hollow shaft to limit axial movement of said first and second plates in a first axial direction, means for normally applying a first force to said first and second plates in a direction opposite to said first direction to compress said plates against said first stop means to thereby couple said first and second plates, a non-rotatable shaft mounted on said housing and extending into said hollow shaft and being radially spaced therefrom, external axially extending splines on said non-rotatable shaft, third friction plates engaging and axially movable on said external splines on said non-rotatable shaft, fourth friction plates engaging and axially movable on said internal splines on said hollow shaft and being interleaved with said third friction plates, a second stop member on said hollow shaft to limit the axial movement of said third and fourth plates in a second axial direction, means operable to impart a force to said third and fourth plates in a direction opposite said second axial direction to compress them against said second stop means to impart an anti-rotational force to said shaft, and means to control the application of said first and second forces.

2. A compact drive assembly for selectively driving and imparting an anti-rotational force to an output gear including a housing, a gear rotatably mounted in said housing, a hollow hub on said gear, a hollow shaft rotatably mounted in said housing and having one end extending into said hub and radially spaced therefrom, the other end of said hollow shaft connected to said output gear, first axially movable friction plate means secured against relative rotaion internally in said hub, second axially movable friction plate means secured against relative rotation on one end of said shaft for cooperation with said first friction plate means, first stop means to limit axial movement of said first and second friction means in a first axial direction, means for normally applying a first force to said first and second friction means in a direction opposite to said first direction to thereby couple said first and second friction means, a non-rotatable member mounted on said housing and extending into said hollow shaft, third axially movable friction plate means secured against relative rotation on said non-rotatable member, fourth axially movable friction plate means secured against relative rotation on said hollow shaft means and associated with said third friction plates, a second stop member to limit the axial movement of said third and fourth friction means in a second axial direction, means operable to impart a force to said third and fourth means in a direction opposite said second axial direction to separate them, and actuator means to control the application of said first and second forces.

3. A compact drive assembly as defined in claim 2 wherein said first and second axial direction are opposite directions, and said actuator means is a fluid actuated piston device which moves in one direction to uncouple said first and second friction means and to urge said third and fourth friction means together.

4. A drive assembly for selectively operating an output gear in opposite directions with substantial freedom from backlash comprising, a reversible fluid motor for driving an input pinion; said motor having a pair of fluid connections; a shiftable control valve for connecting a source of high pressure fluid to one of said connections and for venting the other of said connections to control the direction of rotation of said motor; two identical gear trains interconnecting said input pinion and said output gear, each of said trains including an input gear in engagement with said input pinion, an output pinion engaged with said output gear, a clutch normally interconnecting said input gear and said output pinion, a fluid clutch motor for disengaging of said clutch, a normally disengaged drag brake, and a fluid brake motor for engaging said drag brake for applying an anti-rotational force to said output pinion; control valve means having a fluid actuator at each end thereof, one of said fluid actuators being connected to said one fluid connection and the other of said actuators being connected to said other connection for movement of said control valve between first position when said one fluid connection is connected to the source of high pressure and to a second position when said other fluid connection is connected to the source, said control means in said first position connecting fluid pressure to said clutch and drag motors of one of said trains to thereby disengage completely said clutch and engage said brake of said one of said trains and in said second position connecting high pressure to said clutch and drag motors of the other of said gear trains to thereby disengage completely said clutch and engage said brake of said other of said trains so that said clutch and drag motor are operated in response to the direction of drive of said reversible motor for backlash free operation of the drive assembly.

5. A drive assembly for selectively operating an output gear in opposite directions with substantial freedom from backlash comprising, a reversible hydraulic motor for driving an input pinion; said motor having a pair of hydraulic connections; a shiftable control valve for connecting a source of high pressure liquid to one of said connections and for venting the other of said connections to control the direction of rotation of said motor; two identical gear trains interconnecting said input pinion and said output gear, each of said trains including an input gear in engagement with said input pinion, an output pinion engaged with said output gear, a clutch normally interconnecting said input gear and said output pinion, a fluid clutch motor for disengaging of said clutch, a normally disengaged drag brake, and a fluid brake motor for engaging said drag brake for applying an anti-rotational force to said output pinion; control valve means having a hydraulic actuator at each end thereof; one of said actuators being connected to said one hydraulic connection and the other of said actuators being connected to said other connection for movement of said control valve between first position when said one connection is connected to the source of high pressure liquid and to a second position when said other connection is connected to a source of high pressure, said control means in said first position connecting a separate source of fluid pressure to said clutch and drag motors of one of said trains to thereby disengage completely said clutch and engage said brake of said one of said trains and in said second position connecting the separate source to said clutch and drag motors of the other of said gear trains to thereby disengage completely said clutch and engage said brake of said other of said trains so that said clutch and drag motor are operated in response to the direction of drive of said reversible motor.

6. A drive assembly for selectively operating an output gear in opposite directions with substantial freedom from backlash comprising, a reversible fluid motor for driving an input pinion; said motor having a pair of fluid conduits connected thereto, a shiftable control valve for connecting a source of high pressure fluid to one of said conduits and for venting the other of said conduits to control the direction of rotation of said motor; two idential gear trains interconnecting said input pinion and said output gear, each of said trains including an input gear in engagement with said input pinion, an output pinion engaged with said output gear, a clutch normally interconnecting said input gear and said output pinion, a fluid clutch motor for disengaging of said clutch, a normally disengaged drag brake, and a fluid brake motor for engaging said drag brake for applying an anti-rotational force to said output pinion; control valve means having a fluid actuator at each end thereof; one of said fluid actuators being connected to said one fluid connection and the other of said actuators being connected to said other connection for movement of said control valve between first position when said one fluid connection is connected to the source of high pressure and to a second position when said other fluid connection is connected to the source, said control means in said first position connecting fluid pressure to said drag motors of one of said trains to thereby disengage completely said clutch of said one of said trains and in said second position connecting high pressure to said clutch motor of the other of said gear trains to thereby disengage completely said clutch of said other of said trains so that said clutches are operated in response to the direction of drive of said reversible motor, one of said drag motors being connected to each of said conduits for applying a drag force which is proportional to the direction of drive and torque output of said reversible motor.

References Cited in the file of this patent
UNITED STATES PATENTS

| | | |
|---|---|---|
| 1,482,924 | Hescock | Feb. 5, 1924 |
| 2,598,633 | Baldwin | May 27, 1952 |
| 2,868,028 | Ziegler | Jan. 13, 1959 |
| 2,895,342 | Hayhurst | July 21, 1959 |
| 2,968,965 | Swanson | Jan. 24, 1961 |